United States Patent
Cho et al.

(10) Patent No.: US 12,389,907 B2
(45) Date of Patent: Aug. 19, 2025

(54) **COMPOUNDS WITH NEMATICIDAL ACTIVITY TO PINEWOOD NEMATODE *BURSAPHELENCHUS XYLOPHILUS***

(71) Applicant: KOREA ADVANCED INSTITUTE OF SCIENCE AND TECHNOLOGY, Daejeon (KR)

(72) Inventors: Byung-Kwan Cho, Daejeon (KR); Soonkyu Hwang, Daejeon (KR); Hyeseong Kim, Daejeon (KR); Jaemin Seong, Daejeon (KR); Jongoh Shin, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/985,731

(22) Filed: Dec. 18, 2024

(65) Prior Publication Data

US 2025/0204527 A1 Jun. 26, 2025

(30) Foreign Application Priority Data

Dec. 21, 2023 (KR) .......... 10-2023-0188638

(51) Int. Cl.
*A01N 43/16* (2006.01)
*A01P 5/00* (2006.01)

(52) U.S. Cl.
CPC ............... *A01N 43/16* (2013.01); *A01P 5/00* (2021.08)

(58) Field of Classification Search
CPC .................................................. A01N 43/16
See application file for complete search history.

(56) References Cited

FOREIGN PATENT DOCUMENTS

KR 10-2009-0037158 A 4/2009

OTHER PUBLICATIONS

Rahim, Nurhidayah Ab, et al. "Antioxidant activity, total phenolic and flavonoid content and LC-MS profiling of leaves extracts of Alstonia angustiloba." Separations 9.9 (2022): 234.
Weber, Daniela, Olov Sterner, and Timm Anke. "Mollisianitrile, a new antibiotic from Mollisia sp. A59-96." Zeitschrift Für Naturforschung C 62.7-8 (2007): 567-570.
Zinad, Dhafer Saber, et al. "Bioactive isocoumarins from a terrestrial Streptomyces sp. ANK302." Natural Product Communications 6.1 (2011): 1934578X1100600111.
Kim, Ki Hyun, et al. "Naphthalenones and isocoumarins from a Costa Rican fungus Xylariaceae sp. CR1546C." Journal of Chemical Research 38.12 (2014): 722-725.
KR 10-2023-0188638 Notice of Allowance issued by the Korean Patent Office dated Apr. 17, 2025.

*Primary Examiner* — Valerie Rodriguez-Garcia
(74) *Attorney, Agent, or Firm* — Edwin S. Flores; Daniel J. Chalker; Chalker Flores, LLP

(57) ABSTRACT

The present invention relates to compounds with nematicidal activity to pinewood nematode *Bursaphelenchus xylophilus*.

6 Claims, 2 Drawing Sheets

Figure 1:
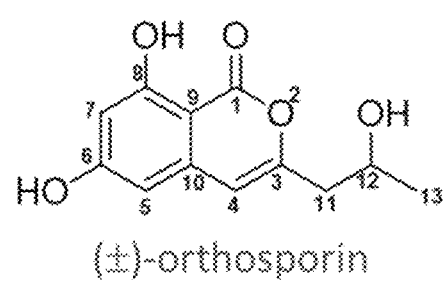
Figure 1:
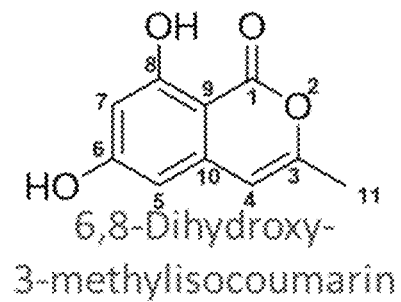

(±)-orthosporin 6,8-Dihydroxy-
3-methylisocoumarin

COMPOUNDS WITH NEMATICIDAL ACTIVITY TO PINEWOOD NEMATODE *BURSAPHELENCHUS XYLOPHILUS*

CROSS-REFERENCE TO RELATED APPLICATIONS

This application claims priority to Republic of Korea Patent Application Serial No. 10-2023-0188638, filed on Dec. 21, 2023, the entire contents of which are incorporated herein by reference.

TECHNICAL FIELD OF THE INVENTION

The present invention relates to compounds with nematicidal activity to pinewood nematode *Bursaphelenchus xylophilus*.

BACKGROUND OF THE INVENTION

Pinewood nematode (*Bursaphelenchus xylophilus*) belongs to the nematode family, and parasitizes, Japanese pine, black pine, Korean pine, and needle fir, causing the host plants to die. Pinewood nematode enters the body of vectors and is transmitted between trees through the vectors. Pinewood nematode proliferates by feeding on fungi within the trees and causes the death of pine trees by closing the plant's tracheids and thus blocking water movement.

The death of pine trees caused by the pinewood nematode is a global problem, spreading rapidly, particularly in in Western Europe and Northeast Asia, including Korea, causing massive forest damage. There are methods for controlling pine wilt disease: targeting the pine beetle, cutting infected trees down and then treating the trees with chemicals, and injecting nematicides into pine trees.

The avermectin-based nematicides (emamectin, abamectin, ivermectin, and the like) target a unique form of glutamate-gated chloride channel that exists only in invertebrates, and are known to exhibit insecticidal effects by increasing the chloride ion permeability of the cytoplasmic membrane. Korean Patent Publication No. 10-2009-0037158 discloses a nematicidal agent for pinewood nematode containing one or more plant extracts selected from the group consisting of celery (*Apium graveolens*), lemongrass (*Cymbopogon flexuosus*), Citronella grass (*Citronella grass Cymbopogon witerianus*), caraway (*Trachyspermum ammi*), pine (*Pinus roxburghii*), and basil (*Ocimum basilicum*) as the active ingredients.

However, these substances are not sufficiently effective in selectively eradicating the pinewood nematode, and therefore it is necessary to conduct studies on new compositions for pinewood nematode control.

SUMMARY OF THE INVENTION

Technical Problem

An object of the present invention is to provide a composition for pinewood nematode control, containing a compound represented by the following Chemical Formula 1 or a salt thereof as an effective ingredient:

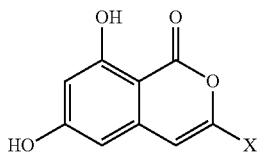

[Chemical Formula 1]

where X is a methyl group (—CH$_3$) or a 2-propanol group (—CH$_2$CH(OH)CH$_3$).

Another object of the present invention is to provide a nematicidal agent for pinewood nematode containing a compound represented by Chemical Formula 1 or a salt thereof as an effective ingredient.

Still another object of the present invention is to provide a method for preventing or treating pine wilt disease, which includes using a composition containing a compound represented by Chemical Formula 1 or a salt thereof as an active ingredient.

Still another object of the present invention is to provide a method for controlling pinewood nematode, which includes using a composition containing a compound represented by Chemical Formula 1 or a salt thereof as an active ingredient.

Technical Solution

This is specifically explained as follows. Meanwhile, each description and each embodiment disclosed in the present invention may also be applied to another description and another embodiment, respectively. In other words, all combinations of various elements disclosed in the present invention fall within the scope of the present invention. Additionally, the scope of the present invention should not be considered limited by the specific descriptions described below.

Those skilled in the art will recognize, or be able to ascertain using no more than routine experimentation, many equivalents to the specific aspects of the present invention described herein. Additionally, such equivalents are intended to be included in the present invention.

Throughout this specification, numerous papers and patent documents are referenced and cited. The disclosures of the cited papers and patent documents are incorporated herein by reference in their entirety to more clearly explain the level of the technical field to which the present invention pertains and the content of the present invention.

An aspect of the present invention is a composition for pinewood nematode control, containing a compound represented by the following Chemical Formula 1 or a salt thereof as an effective ingredient:

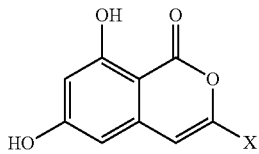

[Chemical Formula 1]

where X is a methyl group (—CH$_3$) or a 2-propanol group (—CH$_2$CH(OH)CH$_3$).

In an embodiment, the composition for pinewood nematode control of the present invention contains a compound represented by the following Chemical Formula 2 or a salt thereof as an active ingredient:

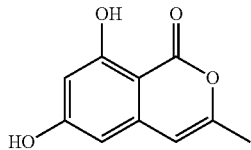

[Chemical Formula 2]

The compound represented by Chemical Formula 2 is also named 6,8-dihydroxy-3-methylisocoumarin, and its IUPAC name is 6,8-dihydroxy-3-methyl-1H-isochromen-1-one. The CAS number of the compound represented by Chemical Formula 2 is 1204-37-1.

In an embodiment, the composition for pinewood nematode control of the present invention contains a compound represented by the following Chemical Formula 3 or a salt thereof as an active ingredient:

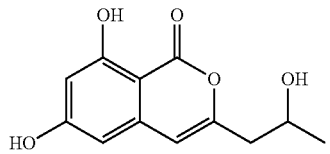

[Chemical Formula 3]

The compound represented by Chemical Formula 3 is also named orthosporin, and its IUPAC name is 6,8-dihydroxy-3-(2-hydroxypropyl)-1H-isochromen-1-one. The CAS number of the compound represented by Chemical Formula 3 is 118063-79-9.

In a specific example of the present invention, the compounds represented by Chemical Formulas 2 and 3 were each dissolved in a polar solvent, DMSO, and nematode was treated with the solution, and as a result, the compounds were found to have the effect of killing the nematode, whereby the present invention has been completed.

In the present invention, the term "nematode" is used interchangeably with "pinewood nematode", and refers to a nematode that parasitizes and feeds on trees such as Japanese pine, Korean pine, black pine, and needle fir. Pinewood nematode is a thread-like nematode measuring about 1 mm in size, and is known to live inside the body of a vector and infect the tree through wounds when the vector feeds on new shoots.

In the present invention, the pinewood nematode may be *Bursaphelenchus xylophilus* (*B. xylophilus*), a causative organism of pine wilt disease.

In the present invention, "pine wilt disease" refers to a plant disease in which pine needles wilt and die due to infection by pinewood nematode.

Pine wilt nematode disease may be caused by the blocking of water movement due to the closing of tracheids, pine cell death due to a hypersensitive reaction, and stress due to bacterial/fungal toxins of pinewood nematode.

In an example, pine wilt disease may be caused by rapid proliferation of pinewood nematode within a pine tree over a short period of time and the closing of tracheids, but is not limited thereto, and may be caused by a close correlation among the pine tree of the host tree, the pine wilt beetle as the vector, pinewood nematode as the pathogen, and a third factor such as microorganisms.

Pine wilt disease exhibits symptoms such as pine needles turning light green or brown over time after infection, pine leaves drooping in an umbrella-like shape, weakening of the tree, showing traces of escape of vectors (escape holes), dry pine bark, or a complete absence of pine resin when the tree is cut with a saw, but is not limited thereto.

In the present invention, "control" means preventing plants such as crops from damage by pests, eliminating pathogens that have been generated, or preventing the spread of pathogens.

For the purpose of the present invention, the control may be to kill, paralyze, eliminate, or prevent the spread of pinewood nematode pathogens by using the compound of the present invention or a salt thereof, and may specifically mean killing of pinewood nematode.

The composition of the present invention may additionally contain a substance commonly used in insecticide or bactericide. In an example, the composition may contain a substance used for controlling pinewood nematode, and may specifically contain compounds such as abamectin and ivermectin, which have been verified to exhibit existing nematode control effects, but is not limited thereto.

The composition of the present invention may further contain acceptable solid carriers, liquid carriers, liquid diluents, liquefied gas diluents, solid diluents or other auxiliary agents, for example, surfactants such as an emulsifier, a dispersant or a foaming agent as excipients in addition to the active ingredient. The composition for control of the present invention may be prepared into an agricultural composition by mixing the active ingredient with the excipients, and used. As for the method for preparing the composition into an agricultural composition, all methods commonly used in the art may be applied.

The composition for control of the present invention may be provided in the form of a wettable powder, granule, powder, emulsion, spray, smoke, capsule, or gel, but is not limited thereto.

Another aspect of the present invention is a nematicidal agent for pinewood nematode containing a compound represented by Chemical Formula 1 or a salt thereof as an active ingredient.

The compound may be a compound represented by Chemical Formula 2 or Chemical Formula 3 described above.

The compound, nematode, and control are as described above.

The treatment of pine wilt disease in the present invention may be understood to mean the same as the "control" of pinewood nematode or a condition achieved by such control.

In the present invention, the term "prevention" means any action that inhibits or delays the onset of pine wilt disease by the compound of the present invention, and the term "treatment" means any action that improves or beneficially changes the symptoms of pine wilt disease by administration and/or treatment with the compound of the present invention.

Still another aspect of the present invention provides a method for controlling pinewood nematode, which includes using a composition containing a compound represented by Chemical Formula 1 or a salt thereof as an active ingredient.

Still another aspect of the present invention provides a method for preventing or treating pine wilt disease, which includes using a composition containing a compound represented by Chemical Formula 1 or a salt thereof as an active ingredient.

The control or treatment method may include treating one or more of an insect, a plant, a plant seed, or a plant cultivation site with the composition. The control or treatment method may also include bringing a composition or preparation containing the compound of the present invention into direct contact with *Bursaphelenchus xylophilus*, the causative organism of pine wilt disease, through the treatment.

In an embodiment, a composition or preparation containing the compound represented by Chemical Formula 1 of the present invention or a salt thereof may be soaked or irrigated, that is, sprayed, onto a crop or a seed of the crop. In the case of the soaking method, the composition or preparation may be poured into the soil around the plant or the seeds may be soaked.

In an embodiment, a composition or preparation containing the compound represented by Chemical Formula 1 of the present invention or a salt thereof may be injected into a tree trunk. The method for injecting the composition of the present invention into a tree trunk includes an ampoule injection method, a spot injection method, a boring injection method, a field injection method, and a drop injection method. The injected amount may be appropriately selected depending on the purpose, time, age, size of the tree, and damage situation.

As the control method of the present invention, not only chemical control using a bactericide or insecticide that is toxic to pests, but also a method of creating an unfavorable environment for pathogens through cultivation of resistant plants, crop rotation and the like, a method of eliminating pathogens by heat-treating plants or steaming soil, and a method of attracting and killing pests using an attractant or sex pheromone may be used together.

Advantageous Effects

The nematicidal agent of the present invention has the advantage of great potential since the nematicidal agent can be mass-produced as a compound nematicidal agent compared to existing known biological nematicidal agents, and is easily sprayed than biological nematicidal agents.

DETAILED DESCRIPTION OF THE INVENTION

Figure 2:
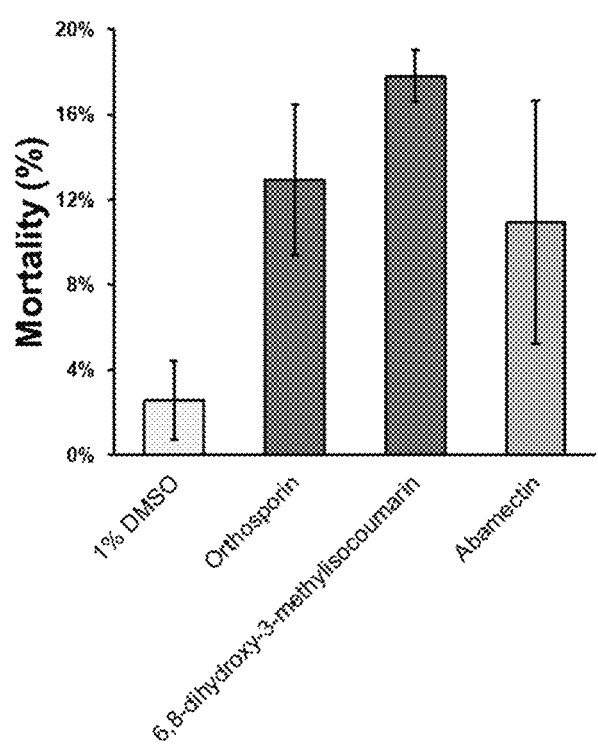

For a more complete understanding of the features and advantages of the present invention, reference is now made to the detailed description of the invention along with the accompanying figures and in which:

FIG. 1 illustrates the structures of two lactone-based compounds tested in the present invention; and FIG. 2 illustrates the results of an experiment to verify the nematicidal effect of four lactone-based substances.

DETAILED DESCRIPTION OF PREFERRED EMBODIMENTS

Hereinafter, the present invention will be described in more detail through Examples and Experimental Examples. However, these Examples and Experimental Examples are intended to exemplify the present invention, and the scope of the present invention is not limited to these Examples and Experimental Examples.
Method for Cultivating and Propagating Pinewood Nematode (*Bursaphelenchus xylophilus*)

(1) PDA medium was prepared by sterilization using an autoclave. When cooled to 60° C. or less, the PDA medium was dispensed into 90 pi petri dish by 30 mL.

TABLE 1

| PDA medium (BD Difco 213400 Potato Dextrose agar product) | |
|---|---|
| Composition | Weight/Volume |
| Potato extract | 4 g |
| Dextrose | 20 g |
| Agar | 15 g |
| Distilled water | 1 L |

(2) The scalpel was prepared by sterilization using an autoclave.

(3) *B. cinerea* KACC 04573 stock cultured on PDA solid medium was prepared. The PDA medium where the mycelia tip of the strain was located was cut into several pieces having a size of about 0.2 cm×0.2 cm using a scalpel.

(4) Four of the agar pieces prepared in (3) were placed on the PDA medium prepared in (1) using the yellow tip end.

(5) Incubation was performed in an incubator at 26° C. for 3 days.

(6) 1,000 pinewood nematodes were injected onto the *B. cinerea* KACC 04573 solid medium prepared in (5).

(7) Incubation was performed in an incubator at 26° C. until the white mycelia of the strain *B. cinerea* KACC 04573 disappeared and the PDA medium turned black to propagate the pinewood nematodes.

(8) Sterilization using an autoclave was performed with a rubber hose about 8 cm long connected to a funnel to prepare the funnel.

(9) After the entrance of a 1.7 mL Ep-tube was cut using scissors, the 1.7 mL Ep-tube was inserted into the lower part of the rubber hose prepared in (8) for assembly.

(10) The funnel assembled in (9) was fixed to the nematode separation platform, and two hand towels were placed flatly overlapping each other on the funnel.

(11) After PDA prepared in (7) was cut into pieces using a spatula, and the agar pieces were placed on the hand towels prepared in (10). Afterwards, the agar pieces were wrapped with the remaining parts of the hand towels.

(12) Distilled water was poured into the funnel until the funnel was filled.

(13) It was waited for about 8 to 10 hours for the proliferated pinewood nematodes to pass through the hand towels and gather in the Ep-tube at the bottom of the funnel.

(14) The Ep-tube connected to the lower part of the rubber hose of the funnel was disconnected.

(15) The supernatant in the Ep-tube was removed, and then 700 µL of distilled water was dispensed into the Ep-tube.

(16) After the pinewood nematodes settled at the bottom of the Ep-tube, the process (15) was performed again.

(17) The process (16) was repeated two times.

(18) A 50 mL conical tube was prepared, and about 30 mL of distilled water was dispensed into the 50 mL conical tube.

(19) The pinewood nematodes prepared by completing the processes up to the process (17) were transferred into the conical tube prepared in (18). Afterwards, the conical tube was shaken to mix the water containing pinewood nematodes thoroughly. Of this, 10 µL was transferred onto a stained glass using a pipette. This process was repeated two more times so that three droplets of 10 µL each were finally placed on the stained glass.

(20) The stained glass was placed on the stage of an optical microscope. The objective lens of the optical microscope was adjusted to 4×, and the number of nematodes in each droplet was counted at an optical magnification of 40×. The number of nematodes in all three droplets was counted, and then the number of nematodes in 10 μL was averaged.

(21) The number of nematodes per 1 μL in a 50 mL conical tube containing nematodes was recorded, and then the 50 mL conical tube containing nematodes was stored at 4° C.

The strains used are as follows.

| Organism | Information |
| --- | --- |
| *Botrytis cinerea* KACC 04573 | Wild-type, Obtained from the Korea Agricultural Culture Collection |
| *Bursaphelenchus xylophilus* (Pine wood nematode, PWN) | Wild-type, Isolated from the dead *Pinus densiflora* in Korea pine forest |

Nematode Screening Method and Test Results (1) A pinewood nematode sample was prepared so that 130 to 150 nematodes were present per 40 μL.

(2) The pinewood nematode sample was dispensed into a 96-well plate by 40 μL. Triplicates were prepared for each sample.

(3) Each compound was dispensed into each well containing the pinewood nematode sample. The tested compounds were (±)-orthosporin and 6,8-dihydroxy-3-methylisocoumarin, and each compound was dissolved in 1% DMSO solvent at a concentration of 20 μM. The chemical formulas of the compounds are illustrated in FIG. 1.

(4) After 120 hours, 20 μL of 50 μM propidium iodide was dispensed into each well containing the sample, and then shaking incubation was performed at RT for 15 minutes.

(5) The mortality rate was evaluated by counting only dead pinewood nematodes stained red in the total number of nematodes using a fluorescence microscope.

The results of treating nematodes with two compounds are illustrated in FIG. 2.

As can be seen in FIG. 2, it was found that a higher nematicidal effect was exhibited compared to abamectin, which is known as an existing nematicidal substance.

From the above description, those skilled in the art to which the present invention pertains will understand that the present invention can be implemented in other specific forms without changing the technical idea or essential characteristics thereof. In this regard, it should be understood that the embodiments described above are illustrative in all respects but not restrictive. The scope of the present invention is defined by the appended claims rather than by the description preceding them, and all changes or modifications derived from the meaning and scope of the claims and their equivalent concepts should be construed as being included in the scope of the present invention.

6. The method according to claim 2, wherein the compound is a compound represented by the following Chemical Formula 3:
[Chemical Formula 3]
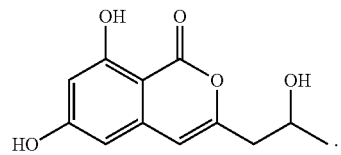

What is claimed is:

1. A method for treating pine wilt disease comprising treating infected pines with a compound of Chemical Formula 1 or a salt thereof as an effective ingredient:

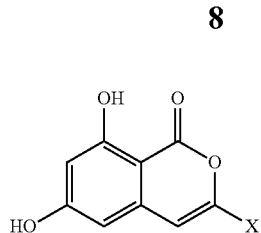

[Chemical Formula 1]

where X is a methyl group (—$CH_3$) or a 2-propanol group (—$CH_2CH(OH)CH_3$).

2. A method for controlling pinewood nematodes comprising contacting infected pinewood with a compound of Chemical Formula 1 or a salt thereof as an effective ingredient:

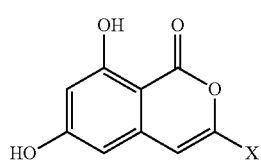

[Chemical Formula 1]

where X is a methyl group (—$CH_3$) or a 2-propanol group (—$CH_2CH(OH)CH_3$).

3. The method according to claim 1, wherein the compound is a compound represented by the following Chemical Formula 2:

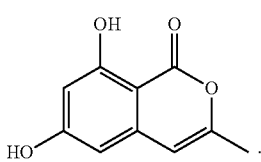

[Chemical Formula 2]

4. The method according to claim 1, wherein the compound is a compound represented by the following Chemical Formula 3:

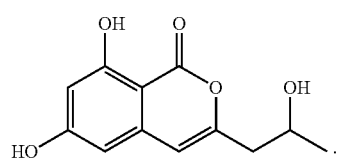

[Chemical Formula 3]

5. The method according to claim 2, wherein the compound is a compound represented by the following Chemical Formula 2:

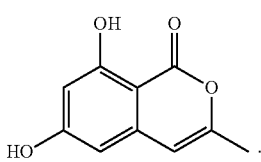

[Chemical Formula 2]